US010822819B2

(12) United States Patent
Andresen et al.

(10) Patent No.: US 10,822,819 B2
(45) Date of Patent: Nov. 3, 2020

(54) METHOD FOR FIRESTOP THROUGH-PENETRATIONS

(71) Applicant: HILTI AKTIENGESELLSCHAFT, Schaan (LI)

(72) Inventors: Arndt Andresen, North Richland Hills, TX (US); Ulf Mordau, Waal (DE); Tamara Sarg, North Richland Hills, TX (US); Lucas Ackerman, McKinney, TX (US); Lisa Van Den Berg, Addison, TX (US)

(73) Assignee: HILTI AKTIENGESELLSCHAFT, Schaan (LI)

( * ) Notice: Subject to any disclaimer, the term of this patent is extended or adjusted under 35 U.S.C. 154(b) by 0 days.

(21) Appl. No.: 16/605,299

(22) PCT Filed: Apr. 20, 2018

(86) PCT No.: PCT/EP2018/060141
§ 371 (c)(1),
(2) Date: Oct. 15, 2019

(87) PCT Pub. No.: WO2018/193073
PCT Pub. Date: Oct. 25, 2018

(65) Prior Publication Data
US 2020/0217092 A1 Jul. 9, 2020

Related U.S. Application Data

(60) Provisional application No. 62/487,926, filed on Apr. 20, 2017.

(51) Int. Cl.
*E04G 15/06* (2006.01)
*E04B 5/40* (2006.01)
(Continued)

(52) U.S. Cl.
CPC .............. *E04G 15/061* (2013.01); *E04B 5/40* (2013.01); *F16L 5/04* (2013.01); *H02G 3/22* (2013.01); *E04B 5/48* (2013.01)

(58) Field of Classification Search
CPC ......... E04G 15/06; E04G 15/061; E04B 5/40; E04B 5/48; H02G 3/22; F16L 5/04
(Continued)

(56) References Cited

U.S. PATENT DOCUMENTS 3,417,191 A * 12/1968 Fork ..................... H02G 3/185
174/481
4,619,471 A * 10/1986 Harbeke .................. F16L 5/02
285/136.1
(Continued)

FOREIGN PATENT DOCUMENTS

DE       41 38 497 A1    7/1992
DE       4138497 A1      7/1992
(Continued)

OTHER PUBLICATIONS

International Bureau, International Search Report in International Application No. PCT/EP2018/060141, dated Jun. 5, 2018.

*Primary Examiner* — Ryan D Kwiecinski
(74) *Attorney, Agent, or Firm* — Leydig Voit & Mayer, Ltd.

(57) ABSTRACT

A method includes coupling a platform to a sheet metal having alternating peaks and Valleys. The platform includes a block-out component configured to conform to a valley of the sheet metal. The method further includes coupling a lead-sleeve to a mounting region of the platform. The method further includes pouring concrete around the platform and lead-sleeve, where the block-out component blocks a flow of the concrete from below the platform. The method also includes inserting a cutting tool through the
(Continued)

lead-sleeve to remove one or more portions of the sheet metal to form a through-penetration.

12 Claims, 4 Drawing Sheets

(51) Int. Cl.
  *H02G 3/22* (2006.01)
  *F16L 5/04* (2006.01)
  *E04B 5/48* (2006.01)

(58) Field of Classification Search
  USPC .................................................. 52/220.8, 317
  See application file for complete search history.

(56) References Cited

U.S. PATENT DOCUMENTS

| | | | | |
|---|---|---|---|---|
| 4,669,759 A | * | 6/1987 | Harbeke | A62C 2/065 277/314 |
| 5,293,724 A | * | 3/1994 | Cornwall | E03F 5/041 285/139.1 |
| 5,913,788 A | * | 6/1999 | Herren | E04B 2/825 52/236.7 |
| 6,314,692 B1 | * | 11/2001 | Munzenberger | E04G 11/40 52/220.1 |
| 8,001,737 B1 | * | 8/2011 | Price | F16L 5/04 52/220.8 |
| 9,759,352 B2 | * | 9/2017 | Lin | F16L 5/04 |
| 2002/0032996 A1 | * | 3/2002 | Cornwall | F16L 5/04 52/220.8 |
| 2011/0062307 A1 | | 3/2011 | Currier et al. | |
| 2013/0008126 A1 | * | 1/2013 | Sabillon | E04G 15/06 52/745.15 |
| 2014/0360127 A1 | * | 12/2014 | Sabillon | E04C 2/52 52/741.4 |
| 2016/0315456 A1 | * | 10/2016 | Foerg | H02G 3/22 |
| 2017/0335996 A1 | * | 11/2017 | Lin | F16L 5/14 |

FOREIGN PATENT DOCUMENTS

| | | | | |
|---|---|---|---|---|
| DE | 10 2012 223 455 A1 | 6/2014 | | |
| DE | 102012223455 A1 | * | 6/2014 | ........... E04G 15/061 |
| DE | 102012223455 A1 | | 6/2014 | |
| JP | 2001-81963 A | | 3/2001 | |
| JP | 2001081963 A | | 3/2001 | |
| WO | WO-0214624 A1 | * | 2/2002 | ........... E04G 15/061 |

* cited by examiner

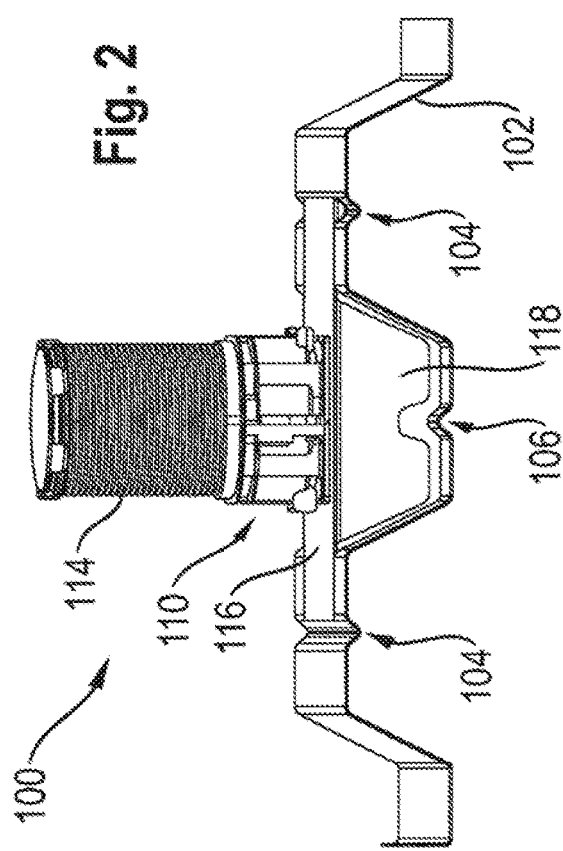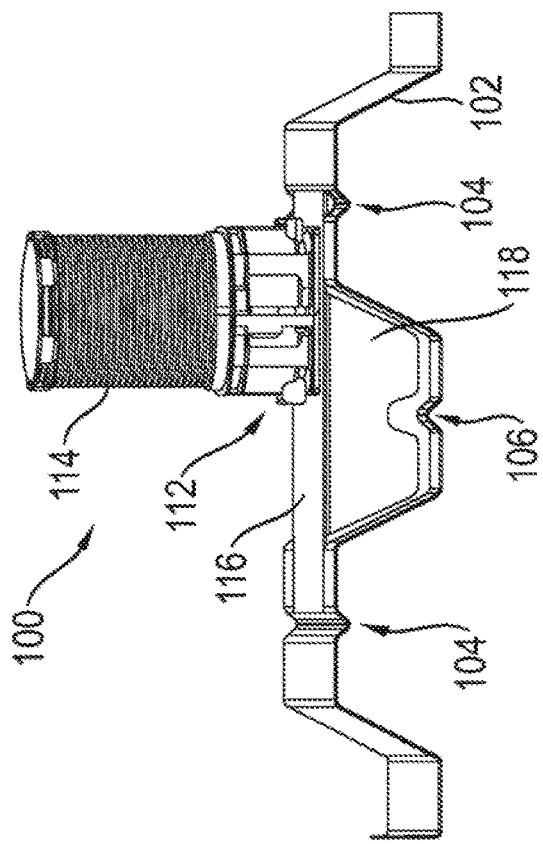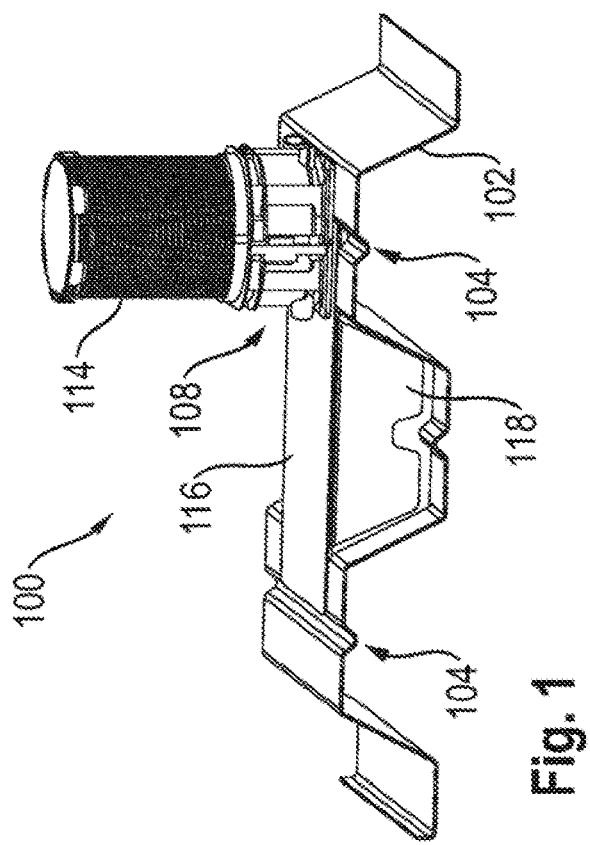

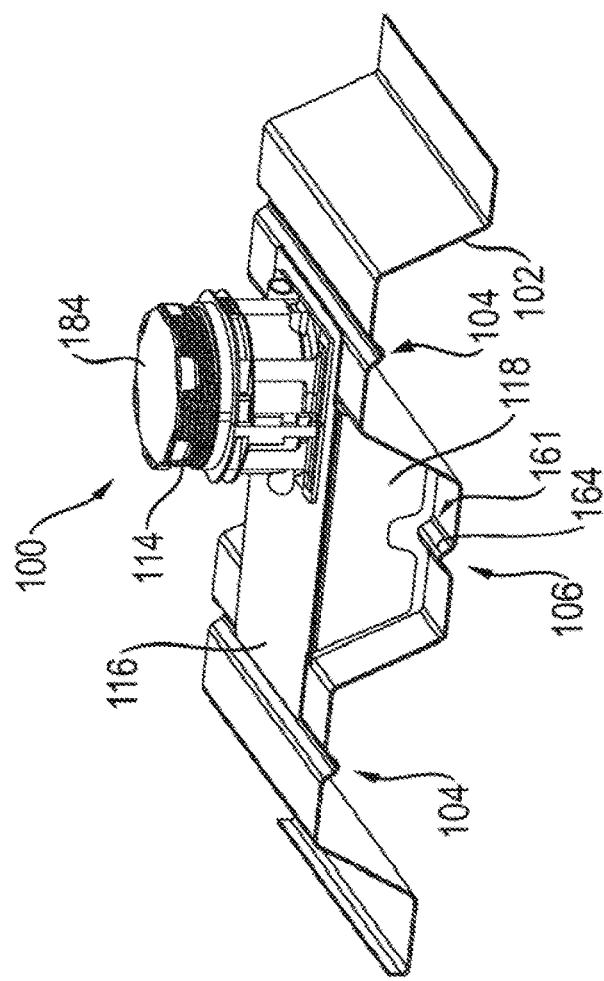
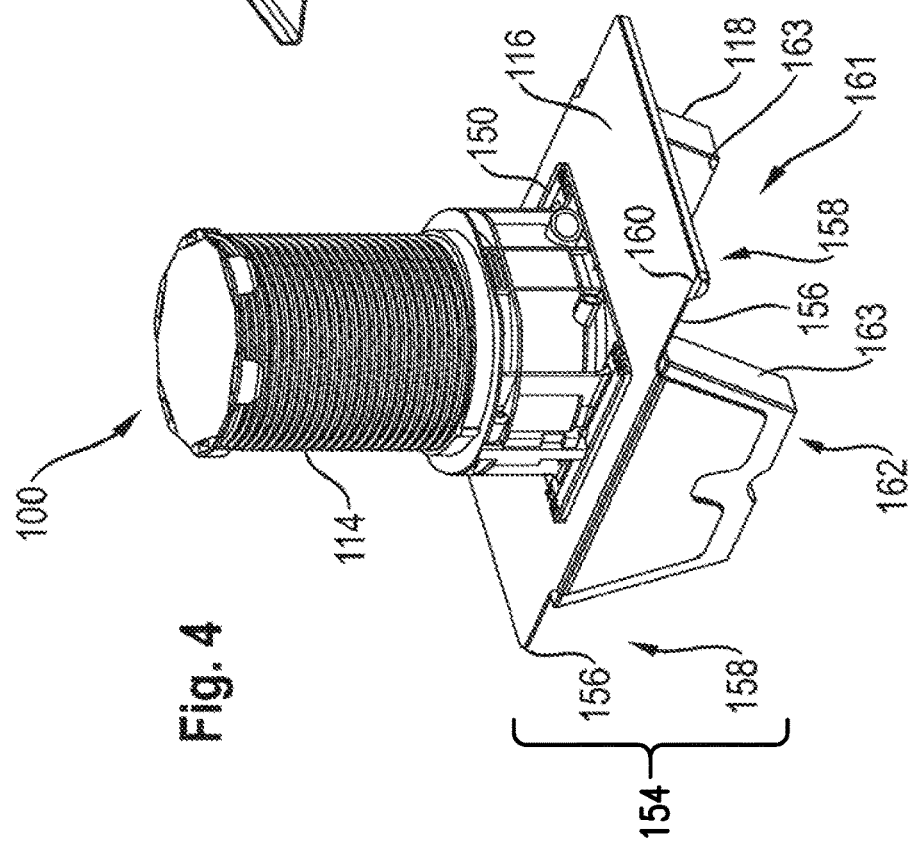

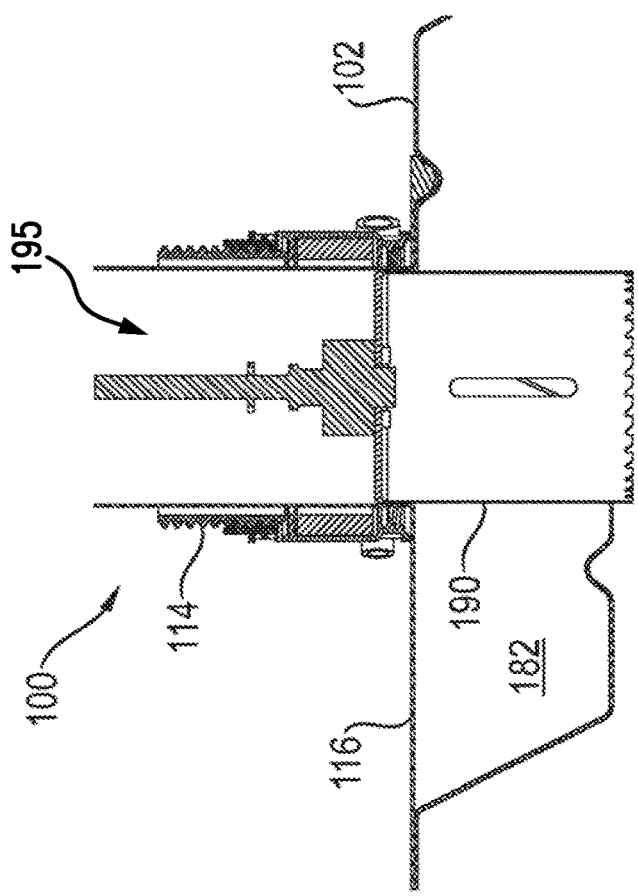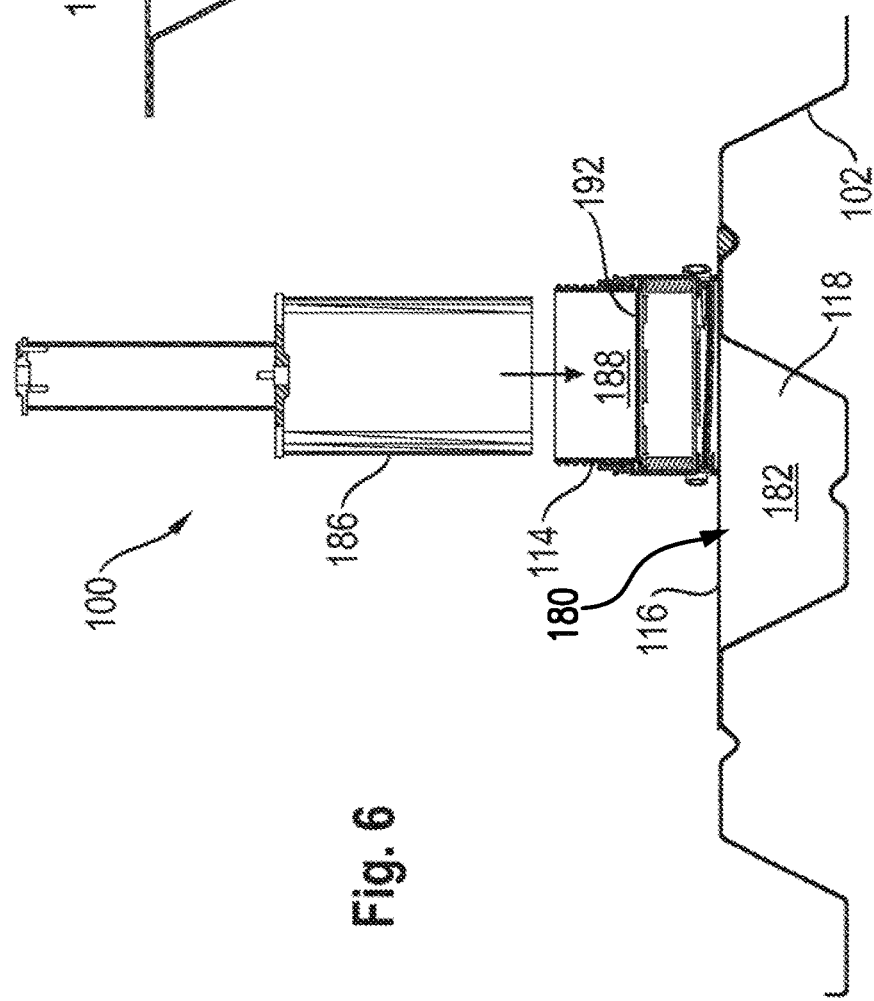

METHOD FOR FIRESTOP THROUGH-PENETRATIONS

BACKGROUND

The present disclosure relates generally to the field of firestop protection, and more particularly to systems and methods for firestop protection within through-penetrations.

In contemporary building constructions, formworks formed of corrugated sheet metal having alternating valley and peak regions are widely used. Formworks may be used in substantially horizontal ceilings, in floors, or in walls. In certain situations, formworks utilized in horizontal ceiling applications may be cast in concrete on-site, such that the corrugated sheet metal remains on the lower side of the ceiling. Furthermore, in certain construction applications, it may be necessary to route tubular leads, conduits, cables, or various other items, through the formwork and the concrete. Accordingly, various techniques may be utilized to form through-penetrations through the corrugated sheet metal so that these and other materials may be routed through the ceiling.

For example, in certain situations, through-penetrations may be formed by drilling holes (e.g. coring) through the poured concrete partition after the concrete has been formed and solidified. As a further example, through-penetrations may be formed by positioning a forming device (e.g., sleeve) before the concrete is poured, and then subsequently removing the device after the concrete solidifies. Furthermore, in certain applications, space retainers may be mounted in the formwork to provide a concrete-free space through the ceiling. For example, space retainers may be secured (e.g., axially and angularly) with respect to a plane of the formwork before concrete is poured to leave behind a through-penetration through the concrete.

However, these and other techniques may be difficult to implement within corrugated sheet metal having alternating valley and peak regions of varying dimensions. Furthermore, these and other techniques may limit positioning flexibility through the formwork, thereby limiting the positioning of various items routed through the ceiling. Accordingly, it may be beneficial to provide systems and methods for forming through-penetrations through formworks in a reliable and flexible manner. Specifically, it may be beneficial to provide techniques for creating through-penetrations that do not compromise the structural integrity of the formwork.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a method is provided. A method includes coupling a platform to a sheet metal having alternating peaks and valleys. The platform includes a block-out component configured to conform to a valley of the sheet metal. The method further includes coupling a lead-sleeve to a mounting region of the platform. The method further includes pouring concrete around the platform and lead-sleeve, where the block-out component blocks a flow of the concrete from below the platform. The method also includes inserting a cutting tool through the lead-sleeve to remove one or more portions of the sheet metal to form a through-penetration.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 1 is a schematic view of an embodiment of a pre-installation system for forming through-penetrations through a peak of a corrugated sheet metal formwork;

FIG. 2 is a schematic view of an embodiment of a pre-installation system for forming through-penetrations through a valley of a corrugated sheet metal formwork;

FIG. 3 is a schematic view of an embodiment of a pre-installation system for forming through-penetrations through a valley and a peak of a corrugated sheet metal formwork;

FIG. 4 is a perspective view of an embodiment of the pre-installation system of FIG. 3, where the pre-installation system includes a platform, a block-out component, and a lead-sleeve coupled to the platform;

FIG. 5 is a schematic view of an embodiment of the pre-installation system of FIG. 1, where the pre-installation system is disposed between a valley and a peak of a corrugated sheet metal;

FIGS. 6 and 7 are a schematic view of an embodiment of the pre-installation system of FIG. 1 utilized with a cutting tool, where the pre-installation system includes a protective guiding sleeve insert.

DETAILED DESCRIPTION

Figure 8:
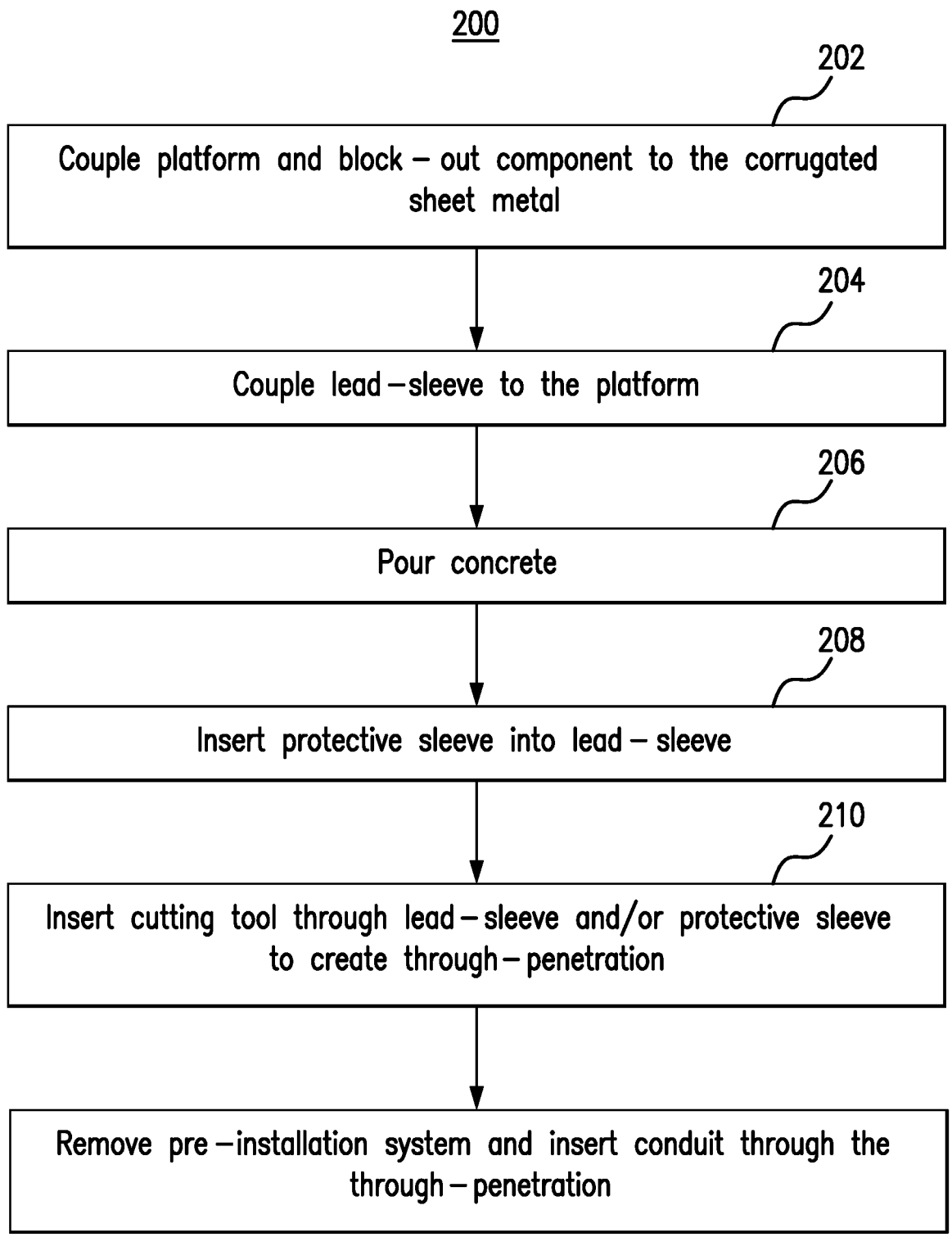
FIG. 8 is a method of inserting a tubular conduit through a corrugated sheet metal formwork.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present embodiments are directed to systems and methods for a pre-installation system utilized to form through-penetrations within a corrugated sheet metal of a formwork. Specifically, the present embodiments generally relate to a pre-installation system that may be utilized to form through-penetrations at any position of a corrugated sheet metal formwork, such as, for example, between a valley and a peak region of the corrugated sheet metal or at a lap joint seam adjoining two panels. In certain embodiments, the pre-installation system may include an platform, a block-out component, and a lead-sleeve configured to couple to the platform. In particular, the platform of the pre-installation system may be utilized as a support structure that extends over a portion of the corrugated sheet metal. For example, in certain situations, the platform may include a flexible component and/or a flexible extension system that may be utilized to bridge a gap between a valley and a peak region of the corrugated sheet metal, as further described in detail below. In certain embodiments, the platform may include one or more features that securely fasten the pre-installation system to the corrugated sheet metal. Further, in certain embodiments, the platform may include a mounting region configured to couple with the lead-in sleeve, as further described in detail below. Additionally, in certain embodiments, the block-out component of the pre-installation system may be utilized to form a concrete-free area in the corrugated sheet metal below the platform to help form the through-penetration in the corrugated sheet metal.

In certain embodiments, the pre-installation system (e.g., the platform, the block-out component, and the lead-in sleeve) may be positioned on the corrugated sheet metal at a desired location before concrete is poured. In particular, the block-out material may create a concrete-free region underneath the pre-installation system after the concrete is poured and solidified. In this manner, a cutting tool may be able to easily cut through the corrugated sheet metal through the concrete-free region to create the through-penetration. For example, in certain embodiments, after the concrete is poured around the pre-installation system, a protective guiding sleeve is inserted into the lead-in sleeve. Further, the cutting tool is inserted through the protective guiding sleeve to cut through the corrugated sheet metal to create a through-penetration through which a tubular conduit (e.g., tubular leads, conduits, cables, etc.) may be inserted.

In particular, as noted above, the pre-installation system may be utilized to create through-penetrations within the corrugated sheet metal in a flexible and efficient manner, at least in part because the pre-installation system may be utilized to generate through-penetrations through the corrugated sheet metal without regard for the position or dimensions of the one or more valleys or peaks of the corrugated sheet metal. Furthermore, the pre-installation system may be utilized to form through-penetrations without comprising the structural integrity of the formwork, at least in part because the corrugated sheet metal is cut after the concrete is poured. These and other features of the pre-installation system are described in further detail with respect to FIGS. 1-8.

Turning now to the drawings, FIGS. 1-3 are embodiments of a pre-installation system 100 for forming through-penetrations through a corrugated sheet metal 102. As illustrated in FIGS. 1-3, the pre-installation systems 100 are disposed at various locations on the corrugated sheet metal 102. In certain embodiments, the pre-installation system 100 may include a lead-sleeve 114, a platform 116, and a block-out component 118. The lead-sleeve 114 may be configured to provide a concrete-free space through the corrugated sheet metal 102, and may be utilized with or without the platform 116 and the block-out component 118. In certain embodiments, the platform 116 may be configured to provide support for the lead-sleeve 114 across various locations of the corrugated sheet metal 102. Further, in certain embodiments, the block-out component 118 may be an elastically compliant membrane (e.g., gasket) that is configured to form a concrete-tight seal across various configurations of the deck profile—such as, but not limited to, lap-joint seams or other proprietary/unique embossed profiles representative of competitive manufactures of the corrugated sheet metal 102. These and other features of the pre-installation system 100 are further described in detail below.

As illustrated in FIG. 1, the pre-installation system 100 may be disposed at a first location 108 on the corrugated sheet metal 102. For example, at the first location 108, the lead-sleeve 114 of the pre-installation system 100 may be disposed at a peak 104 of the corrugated sheet metal 102 and may not be coupled with the platform 116 or the block-out component 118. As illustrated in FIG. 2, the pre-installation system 100 may be disposed at a second location 110. The second location 110 may be disposed at above a valley 106 of the corrugated sheet metal 102, and may be coupled to the platform 116 and the bock-out component 118. Further, as illustrated in FIG. 3, the pre-installation system 100 may be disposed at a third location 112. The third location 112 may be disposed across both the peak 104 and the valley 106 of the corrugated sheet metal 102, and may be coupled to the platform 116 and the block-out component 118. Specifically, at the locations 110 and 112 of FIGS. 1 and 3 respectively, the platform 116 may be utilized to bridge the gap between the alternating valley and peak of the corrugated sheet metal 102. Further, at the locations 110 and 112, the block-out component 118 may be configured to provide a concrete-free space through which a tubular conduit may be later inserted, as further described below.

In certain embodiments, the lead-sleeve 114 of the pre-installation system 100 may be configured to couple to the platform 116 (as further described with respect to FIGS. 2 and 3), thereby allowing the lead-sleeve 114 to be positioned anywhere along the alternating peaks and valleys of the corrugated sheet metal 102. More specifically, the platform 116 may be configured to support the lead-sleeve 114 along the corrugated sheet metal 102, and may be utilized to bridge a gap between the valley 104 and the peak 106 of the corrugated sheet metal 102, such that the pre-installation system 100 may be positioned at any location along the corrugated sheet metal 102—as illustrated in FIGS. 1-3. In certain embodiments, the lead-sleeve 114 may be a fire-retarding system, that includes an intumescent material. For example, the lead-sleeve 114 may include a ring-shaped sealing configured to surround a tubular conduit received through the passage of the lead-sleeve 114, and the ring-shaped sealing may be formed at least in part by the intumescent material. Accordingly, in higher temperatures, the intumescent material expands into a mass to shield the radial perimeter from the heat-generated pressure and closes the opening through which the tubular conduit extends.

FIG. 4 is a perspective view of an embodiment of the pre-installation system 100 of FIG. 3, where the pre-installation system 100 includes the platform 116, the block-out component 118, and the lead-in sleeve 114 coupled to the platform 116. The platform 116 may include a mounting region 150, which may be configured to couple the lead-sleeve 114 to the platform 116. In certain embodiments, the mounting region 150 may include an opening configured to align with the passage through the lead-sleeve 114 after the lead-sleeve 114 is mounted to the platform 116. For example, the opening may be configured to guide the cutting tool through the lead-sleeve 114, as further described below. The opening may be any geometrical shape (e.g., rectangular, circular, irregular free-form, etc.), and the length of the opening may be smaller than the distance between two peaks 104 of the corrugated sheet metal 102 and/or at least the distance of the valley 106. In certain embodiments, the opening may be created on the platform 116 via the cutting tool, as the cutting tool is guided through the lead-sleeve 114, as further described below.

In certain embodiments, the platform 116 may include an extension system 154 that fastens to the corrugated sheet metal 102 to provide support for the lead-sleeve 114 in positions where the lead-sleeve 114 is not entirely positioned at the peak 104 of the corrugated sheet metal 102. In other words, the platform 116 may be configured to support the lead-sleeve 114 utilizing two consecutive peaks 104 of the corrugated sheet metal 102. The extension system 154 may include one or more flanges 156 and/or include one or more attachment ends 158. The flanges 156 and/or attachment ends 158 may extend in either direction to secure the lead-sleeve 114 over the valley 106. The attachment ends 158 may be positions for securing the platform 116 to the corrugated sheet metal 102. In certain embodiments, the attachment ends 158 may include stiff locking elements each having a connection element for forming an interlocking coupling between the attachment ends 158 and the corrugated sheet metal 102. In certain embodiments, the attachment ends 158 may include a grooved emboss feature 160 or compliant block-out component that mates with a groove on the corrugated sheet metal 102 to securely position and seal the pre-installation system 102 over the valley 106 and the peak 104. In certain embodiments, attachment means may be utilized to secure the platform 116 to the corrugated sheet metal 102, such as, for example, screws, pins, adhesives, rivets, welding, direct fastening, hooks, etc. Furthermore, the platform 116 may secure the pre-installation system 100 against vibrations and other forces during subsequent drilling within the concrete. The platform 116 may be formed of a rigid material, such as metal, wood, plastic, fiber-reinforced material, etc.

In certain embodiments, the block-out component 118 may be coupled to the platform 116. Specifically, the block-out component 118 may be formed of any material or construction that prevents the spread of concrete when it is poured into a region of the corrugated sheet metal 102. In the illustrated embodiment, the block-out component 118 may be formed of two parallel components shaped to correspond to the dimensions and shape of the valley 106 (e.g., walls and floor), and may be configured to prevent poured concrete from entering the chamber 161 (e.g., space between the two parallel components, below the platform 116, and above the floor of valley 106), thereby allowing a post cutout of the corrugated sheet metal 102, as further described in detail below. It should be noted that the block-out component 118 may be shaped to fit into the valley 106, such that a base 162 of the block-out component 118 (e.g., the two parallel components) form a tight seal with a floor 163 (as illustrated in FIG. 5) of the valley 106 of the corrugated sheet metal 102. Specifically, the corrugated sheet metal 102 may include variations in the shape, ridges or grooves 164 (as illustrated in FIG. 5), of the floor 163 of the valley 106, and the base 162 may be shaped to form a tight seal against such ridges and grooves 164 of the valley 106. In certain embodiments, the base 162 may be formed of a flexible or pliable material that adapts its shape to conform to the floor 163 of the valley 106. Further, in certain embodiments, the block-out component 118 may be configured to adapt to the angled walls of the valley 106 of the corrugated sheet metal 102.

FIG. 5 is a schematic view of an embodiment of the pre-installation system 100 of FIG. 1, where the pre-installation system 100 is disposed between the valley 106 and the peak 104 of the corrugated sheet metal 102. In the illustrated embodiment, the pre-installation system 100 may be positioned on the corrugated sheet metal 102 before concrete 180 is poured around system 100. In particular, the pre-installation system 100 may prevent the spread of the concrete 180 into certain regions of the corrugated sheet metal 102, thereby helping subsequent cutting of materials through the lead-sleeve 114 to create the through-penetration. For example, as noted above with respect to FIGS. 1-3, the block-out component 118 (e.g., two parallel sections of the block-out component 118) may be configured to prevent the spread of poured concrete 180 between the two parallel sections and underneath the platform 116. In certain embodiments, the block-out component 118 may be a single block section of material that fills a space within the corrugated sheet metal 102, such that the poured concrete 180 spreads around the block-out component 118. In certain embodiments, the block-out component 118 may be a ganged collection of single block sections of material to fill an extended space within the corrugated sheet metal 102, such that the poured concrete 180 spreads around the ganged block-out components 118. In certain embodiments, the block-out component 118 may be formed of any material (e.g., foam, mineral wool, elastic material, flexible material, fiber material, air bladder, cellulose pulp, etc.) that is flexible enough to tightly abut against the floor 163 of the valley 106 of the corrugated sheet metal 102, but may be structured enough to resist the spread or leaking of poured concrete 180.

FIGS. 6 and 7 are a schematic view of an embodiment of the pre-installation system 100 of FIG. 1, where the pre-installation system 100 is utilized with a cutting tool 190. As illustrated in FIG. 6, in certain embodiments, the pre-installation system 100 includes a protective guiding sleeve insert 186. After the poured concrete 180 turns into solidified concrete 182, a cap 184 (illustrated in FIG. 5) covering a passage 188 through the lead-sleeve 114 may be removed. Further, a protective guiding sleeve 186 may be inserted through the passage 188 to protect the lead-sleeve 114 from the cutting process. In certain embodiments, the protective guiding sleeve 186 may be formed of a metal, plastic, foil, waxed cardboard, or any flexible, smooth, and/or non-adhesive surface that facilitates the passage of the cutting tool through the lead-sleeve 114.

The cutting tool 190 may be any cutting tool that may be inserted through the passage 188 of the lead-sleeve 114 to cut out one or more portions of the corrugated sheet metal 102. For example, the cutting tool 190 may be a plasma cutter, a gas torch, a diamond core cutting tool, a hole saw, or any generic cutting tool that forms a through-penetration of the desired diameter without damaging the pre-installation system 100. The cutting tool 190 may include other types of tools, such as drilling tools, grinding tools, laser tools, hole-saws, diamond saws, etc. Preferably, the appropriate cutting tool is selected according to the desired size of the through-penetration pre-determined by the selected lead-in sleeve. As illustrated in FIG. 7, in certain embodiments, the cutting tool 190 may be configured to cut through the block-out material 118 as well as the corrugated sheet metal 102. Further, in certain embodiments, the cutting tool 190 may be configured to avoid damaging other components of the lead-sleeve 114 (e.g., smoke-sleeve 192) when the cutting tool 190 is inserted through the pre-installation system 100. In particular, the cutting tool 190 may be configured to create a passage through the corrugated metal deck 102.

In certain embodiments, a tubular conduit insert may be inserted into the pre-installation system 100 through the through-penetration formed by the cutting tool 190. Specifically, after the cutting tool 190 removes a portion of the corrugated sheet metal 102 and/or the block-out material 118, a tubular conduit may be inserted through the solidified concrete 182.

FIG. 8 is a method 200 of inserting a tubular conduit through a corrugated sheet metal 102. In certain embodiments, the method 200 includes coupling the platform 116 and the block-out component 118 to the corrugated sheet metal 102 (block 202). As described above with respect to FIG. 1, the block-out component 118 may be shaped to conform to the bottom surface and the angles of the valley 106 of the corrugated sheet metal 102. In certain embodiments, the block-out component 118 may be coupled to the platform 116 or may be removably attached to the platform 116. In certain embodiments, the platform 116 may be secured to the corrugated sheet metal 102 with one or more fasteners (e.g., screws, nails, etc.) and/or the attachment ends 158 with the grooves 160. For example, the grooves 160 of the platform 116 may couple with grooves within the corrugated sheet metal 102.

Further, the method 200 includes coupling the lead-sleeve 114 to the platform (block 204). For example, in certain embodiments, the platform 116 may include a mounting region that may be utilized to couple the lead-sleeve 114 to the platform 116.

In certain embodiments, the method 200 includes pouring the concrete 180 onto the corrugated sheet metal 102 such that it spreads over a desired area. It should be noted that the poured concrete 180 does not spread into areas prevented or blocked by components of the pre-installation system 100, such as into the passage 188 of the lead-sleeve 114 or the area below the pre-installation system 100 blocked by the block-out component 118.

The method 200 further includes inserting the protective guiding sleeve 186 into the lead-sleeve 114 (block 208) and inserting the cutting tool 190 through the protective guiding sleeve 186 and the lead-sleeve 114 to create a through penetration (block 210). After the desired portion of the corrugated sheet metal 102 and/or the block-out component 118 is removed, the protective sleeve 186 may be removed from the lead-sleeve 114 and the tubular conduit 195 may be inserted through the corrugated sheet metal 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method, comprising:
coupling a platform to a sheet metal comprising alternating peaks and valleys, wherein the platform comprises a block-out component configured to conform to a valley of the sheet metal;
coupling a lead-sleeve to a mounting region of the platform;
pouring concrete around the platform and lead-sleeve, wherein the block-out component blocks a flow of the concrete from below the platform; and
inserting a cutting tool through the lead-sleeve to remove one or more portions of the sheet metal and the block-out component to form a through-penetration through the sheet metal.

2. The method of claim 1, comprising inserting a tubular conduit through the through-penetration.

3. The method of claim 1, comprising inserting a protective sleeve into the lead-sleeve.

4. The method of claim 3, wherein inserting the cutting tool through the lead-sleeve comprises inserting the cutting tool through the protective sleeve of the lead- sleeve.

5. The method of claim 1, wherein coupling the platform to the sheet metal comprises securing one or more flanges of the platform to one or more grooves of the sheet metal.

6. The method of claim 1, wherein coupling the platform to the sheet metal comprises positioning the mounting region of the platform across a peak and a valley of the sheet metal.

7. The method of claim 1, wherein coupling the platform to the sheet metal comprises positioning the mounting region of the platform across a valley of the sheet metal.

8. The method of claim 1, wherein the block-out component comprises two parallel components having a chamber therebetween.

9. The method of claim 8, wherein the chamber is below the mounting region of the platform.

10. The method of claim 8, wherein the two parallel components conform to a floor of the valley of the sheet metal to prevent the flow of concrete into the space.

11. The method of claim 8, wherein the two parallel components conform to angled walls of the valley of the sheet metal to prevent the flow of concrete into the space.

12. A method, comprising:
coupling a platform to a sheet metal comprising alternating peaks and valleys, wherein the platform comprises a block-out component configured to conform to a valley of the sheet metal:
coupling a lead-sleeve to a mounting region of the platform;
pouring concrete around the platform and lead-sleeve, wherein the block-out component blocks a flow of the concrete from below the platform and
inserting a cutting tool through the lead-sleeve to remove one or more portions of the sheet metal to form a through-penetration through the sheet metal, including creating an opening through the platform.

* * * * *